Patented Aug. 9, 1932

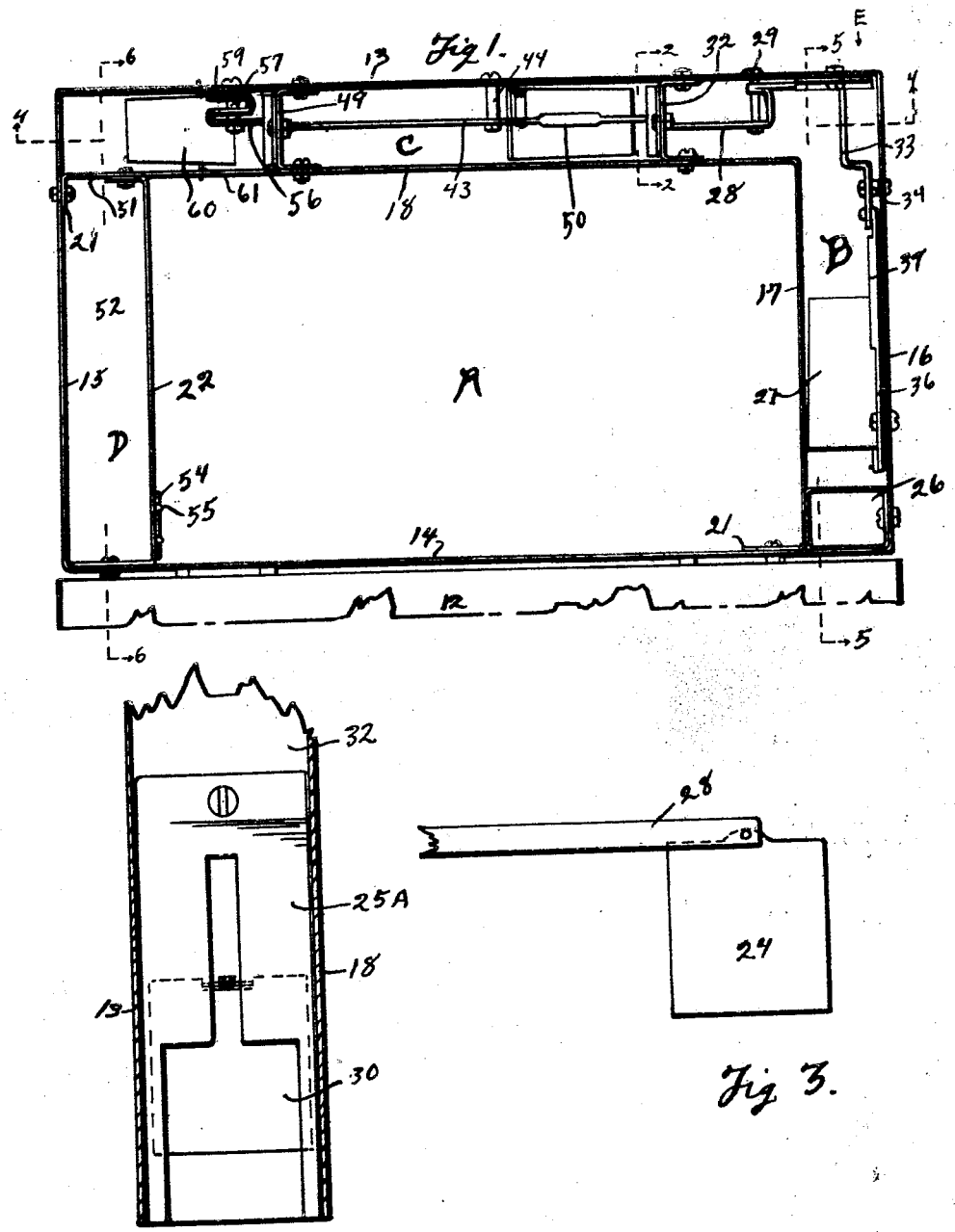

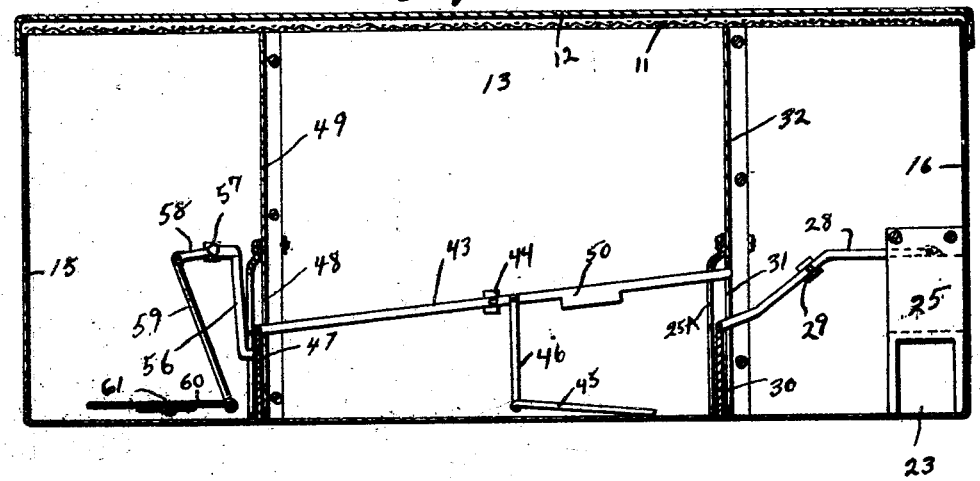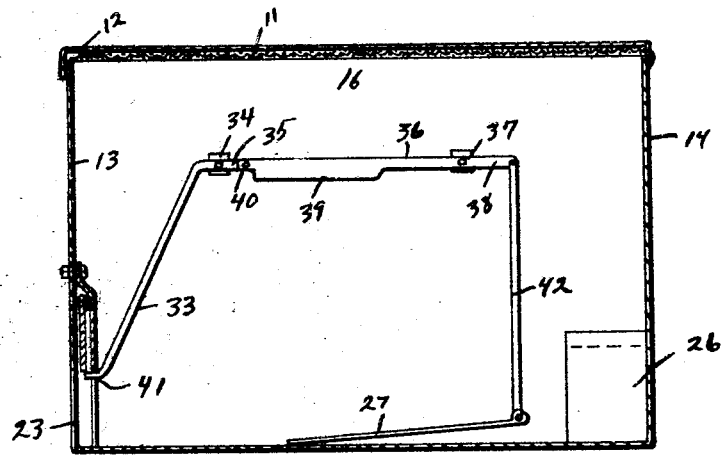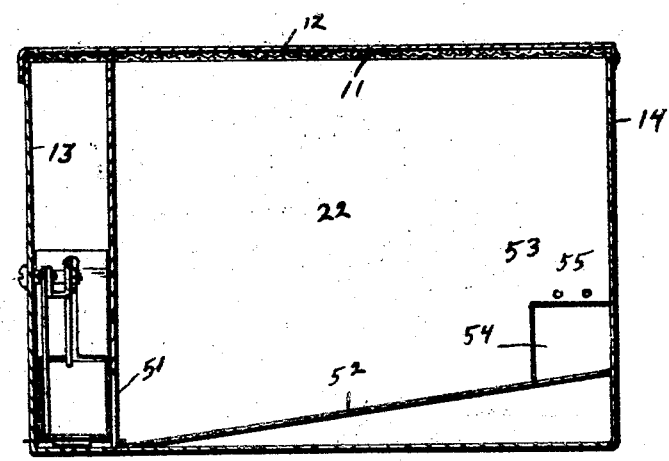

1,870,331

UNITED STATES PATENT OFFICE

JOHN F. HAUCK, OF TYNDALL, SOUTH DAKOTA

ANIMAL TRAP

Application filed August 5, 1929. Serial No. 383,711.

My invention relates to animal traps and has for its object to provide a trap that is especially fitted for catching rodents, such as mice, in large quantities.

More particularly, it is my object to provide a trap, such as a mouse trap, embodying a large compartment for imprisoning the mice, and a plurality of runways and trap doors, particularly adapted to make it easy for several mice, one after another, to enter the trap, but effectively blocking their return in a direction toward their point of entrance.

A further object is a necessary resultant of the foregoing objects, namely, to provide an arrangement in which the various trap doors successively operate to reset the preceding doors so that at all times the trap will be operative to allow the progressive movement of the mice into the trap, and to block return movement.

Another object of my invention is to attain the above objects in a structure of comparatively simple, durable, and inexpensive construction.

With these and further objects in view, my invention consists in the construction and arrangement of the various parts of my invention, whereby the objects contemplated are attained, as hereinafter described, pointed out in my claims, and illustrated in the accompanying drawings, in which:

Fig. 1 is a plan view of the trap.

Fig. 2 is a detail sectional view taken on the line 2—2 of Fig. 1.

Fig. 3 is a detail view of the door which closes the trap entrance.

Fig. 4 is a longitudinal sectional view taken on the line 4—4 of Fig. 1.

Fig. 5 is a transverse sectional view taken on the line 5—5 of Fig. 1, and

Fig. 6 is a transverse sectional view taken on the line 6—6 of Fig. 1.

I have used the reference character 10 to indicate the bottom wall of the trap, which comprises, generally, a box-like structure, closed at the top by a screen 11 and cover 12. The side and end walls of the box-like structure are designated by the numerals 13, 14, 15, and 16, respectively.

An L-shaped partition having the end wall 17 and side wall 18, divides the trap into a central chamber A and the runways B and C respectively. The partition is formed with the end flanges 21, which are bolted, riveted or spot-welded to the walls 14 and 15, respectively.

The runway D is formed by a wall 22, which is secured to the walls 14 and 18 in the same manner as the partition 17, 18.

The animal enters the trap at the point indicated by the letter E in Fig. 1. A door opening 23, (Figs. 4 and 5) is provided at this point, in the wall 13, and is closed by a door 24, (Figs. 3 and 5) which slides behind a door casing 25, (Figs. 4 and 5).

The door opening 23 faces the runway B, and allows the animal to view the bait which is carried in the bait box 26. After entering the trap, the animal will proceed toward the bait, passing over the treadle 27.

The door 24 is carried at one end of a lever 28, fulcrumed to the wall 13 at 29. To the other end of the lever 28 is pivoted a door 30, which closes an opening 31 in a partition 32, arranged across the runway B. The doors 24 and 30 and lever 28 are so arranged that the door 24 overbalances the door 30, tending to travel to its closed position closing the opening 23, and lifting the door 30 to an elevated position disclosing the opening 31. The door 24 is normally held, however, in the elevated position shown in Fig. 4, and the normal position of the door 30 will thus be the closed position.

The mechanism for holding the door 24 in elevated position is shown in Fig. 5. It comprises a latch 33, pivoted at 34 to the wall 16, and projecting therebeyond as at 35, and a lever 36, pivoted at 37 to the wall 16, projecting therebeyond as at 38, and weighted as at 39. The weighted portion of the lever 36 is connected to the portion 35 of the latch, by a pin or rivet 40, whereby the weight 39 pulling downwardly against the portion 35 of the latch, urges the hook 41 of the latch toward the door 24, and under the same when the door has been raised to clear the hook, to hold the door 24 in elevated position.

When the mouse or other animal treads upon the treadle 27, which is connected to the portion 38 of the lever 36 by means of a link 42, the weight 39 will be lifted enough to allow the latch hook 41 to swing away from the door 24, allowing it to drop to closed position, and to raise the door 30. The mouse, is startled by the dropping of the door 24, as it probably will be, will run back toward the opening through which he entered the trap, and, finding this avenue of escape closed, will turn into the runway C.

Due to the fact that the doors 24 and 30 are balanced on opposite ends of the lever 28, the door 30 will always be open when the door 24 is closed, thus allowing the animal to find its way into the runway C. After the animal has entered the runway C, the door 24 may open as will hereinafter be explained, but only during the closing of the door 30. Thus it is impossible for an animal to escape from the runway C and through the opening 23, since the door 24 must be lifted in order to open, and the lifting means is actuated by the animal after passing beyond the door 30.

The lifting means just referred to comprises a lever 43, fulcrumed at 44 to the wall 13, and extends over the door 30 as shown in Fig. 4. A treadle 45, disposed in the runway C where the animal will encounter it after passing through the doorway 31, is linked to the lever 43 by a link 46 in such a manner that depression of the treadle will pull the end of the lever which projects over the door 30 downwardly, pushing the door 30 to closed position and opening the door 24. The trap is then ready for the entrance of another animal, but not until the preceding animal has closed the door 30 behind himself.

The lever 43 carries, at the end opposite the door 30, a door 47, which closes an opening 48 in a partition 49 secured across the runway C. A weight 50 on the lever 43, partly balances the weight of the door 47, so that very little pressure on the treadle 45 will be necessary in order to raise the doors 47 and 24 simultaneously, but the door 47 is adapted to move downwardly under its own weight and to lift the treadle while doing so, when no animal is resting its weight on the treadle.

It will now be seen that the door 47 will be opened simultaneously with the closing of the door 30, and the normal tendency of the animal entrapped in the runway C will be to pass on through the doorway 48 into the end compartment of the runway C, from which he may pass through a door opening 51 in the wall 18, into the runway D, (Fig. 6).

The runway D has an inclined floor 52, leading to an elevated opening 53 in the wall 22, (Fig. 6). The opening 53 is closed by a hanging door 54, suspended at 55 from the wall 22 and capable of inward movement only. The animal after passing through the opening 53, will be imprisoned in the chamber A, from which he may be removed through a suitable door in the screen 12, or by removing the screen.

The door 47 is held open while the animal passes from the treadle 45 to the opening 48, by a latch 56, fulcrumed to the wall at 57, and projecting therebeyond as at 58. A link 59 connects the portion 58 to a treadle 60, which is fulcrumed at 61 between the walls 13 and 18, and which is adapted to raise the link to cause the latch to swing away from the door, when the animal travels over the far extremity of the treadle.

Thus the door 47 will be held open, and the door 30 held closed, until the animal has passed to the far end of the treadle 60. Furthermore it will be impossible for an animal to ever pass back through the opening 23, though another animal ahead should happen to depress the treadle 60, for passage back across the treadle 45 would cause the door 30 to be again closed.

The weight of the link 59 and associated portion of the treadle 60 is sufficient to normally urge the latch 56 against the door 47.

Casing members 25a are provided for each of the door openings 31 and 48, and are identical in construction to the casing 25 with the exception that each is provided with a slot 62 to accommodate the lever 43 and latch 56, respectively. In each case, the door is mounted between the casing member and the adjacent wall, and held against lateral displacement by its supporting lever.

The partitions 49 and 32 are identical in construction. The above features are provided in order to simplify manufacture.

Should there be an animal present in the runway C while another is travelling over the treadle 27, it will of course be impossible for the door 24 to drop, due to the fact that the door 31 will be held down by the lever 43 until the first animal has released the latch 56. However, the depressing of the treadle 27 will allow the door 24 to drop enough to clear the latch hook 41, and the hook will then become inoperative, allowing the door 24 to finish its descent when the first animal has passed the treadle 60. In order that this may be possible, it is essential to balance the doors 24 and 31 carefully, the momentum gained during the upward movement of the door 24 being just sufficient to carry it past the point of the latch hook 41.

It will be seen that my trap is so arranged as to be as fool proof as possible, without involving undue complication in structure for a trap of such capacity. I have found it possible to catch as many as forty mice in the trap during a single night.

Some changes may be made in the construction and arrangement of the various parts of my invention without departing from the true spirit and purpose thereof, and it is my intention to cover by my claims any modified forms of structure or the use of mechanical equivalents that may reasonably be included within their scope.

I claim as my invention:

1. In an animal trap, an enclosing structure formed to provide a pair of runways, an apertured partition separating said runways, a door to close or disclose said aperture, the trap being provide with an entrance providing access from the exterior of the trap to one of said runways near said partition, a door to close said entrance, each of said doors being positioned so as to close in the direction in which gravity urges them, means connecting said doors in such a manner that the entrance door is closed when the partition door is open, and vice-versa, and so that the entrance door overbalances the partition door, means in the other runway, to be actuated by the passage of an animal, to engage the partition door, to move it to closed position and to simultaneously move the entrance door to open position, a second partition in the last mentioned runway, provided with an opening, and positioned on the far side of the first mentioned partition from the entrance, a door to close or disclose said last mentioned opening, connected to the means for moving the connected doors, to be normally opened and closed simultaneously with the opening and closing of the entrance door, and an enlarged compartment communicating with the last mentioned runway beyond the last mentioned partition.

2. In an animal trap, an enclosing structure formed to provide a pair of runways, an apertured partition separating said runways, a door to close or disclose said aperture, the trap being provided with an entrance allowing access from the exterior of the trap to one of said runways near said partition, a door to close or disclose said entrance, each of said doors being positioned so as to close in the directions in which gravity urges them, means connecting said doors in such a manner that the entrance door is closed when the partition door is open, and vice versa, and so that the entrance door overbalances the partition door, a treadle in the entrance runway, a latch lever fulcrumed on a wall of the entrance runway at a height above the entrance door and comprising a latch arm projecting downwardly and terminating in a hook to ride against the inner face of the entrance door and to engage beneath the said entrance door when the latter is fully raised and means connecting the other end of the latch lever to the treadle including a counter-weight device to support the weight of the treadle and to urge the latch hook with a very light pressure against the entrance door, the effect of said counter-weight device being offset by the weight of a mouse on the treadle.

Signed at Sioux City, in the county of Woodbury and State of Iowa, this 27th day of July, 1929.

JOHN F. HAUCK.